(12) United States Patent
Annampedu et al.

(10) Patent No.: US 7,583,458 B2
(45) Date of Patent: Sep. 1, 2009

(54) CHANNEL OPTIMIZATION METRICS

(75) Inventors: Viswanath Annampedu, Schnecksville, PA (US); Pervez M. Aziz, Dallas, TX (US)

(73) Assignee: Agere Systems Inc., Allentown, PA (US)

( * ) Notice: Subject to any disclaimer, the term of this patent is extended or adjusted under 35 U.S.C. 154(b) by 960 days.

(21) Appl. No.: 10/900,546

(22) Filed: Jul. 28, 2004

(65) Prior Publication Data

US 2006/0023583 A1 Feb. 2, 2006

(51) Int. Cl.
G11B 5/09 (2006.01)
G11B 20/10 (2006.01)

(52) U.S. Cl. .............................. 360/39; 360/32; 360/40; 360/51; 360/53; 369/47.1; 369/59.1

(58) Field of Classification Search .................. None
See application file for complete search history.

(56) References Cited

U.S. PATENT DOCUMENTS

| | | | | |
|---|---|---|---|---|
| 5,491,698 A * | 2/1996 | Patel et al. | ................... | 714/709 |
| 5,661,760 A * | 8/1997 | Patapoutian et al. | ........ | 375/341 |
| 5,938,790 A * | 8/1999 | Marrow | ....................... | 714/795 |
| 5,949,831 A * | 9/1999 | Coker et al. | ................. | 375/341 |
| 6,005,727 A * | 12/1999 | Behrens et al. | ............... | 360/48 |
| 6,105,159 A * | 8/2000 | Frederickson | ............... | 714/762 |
| 6,185,175 B1 * | 2/2001 | Zook | ....................... | 369/53.35 |
| 6,385,239 B1 * | 5/2002 | Okamoto et al. | ............. | 375/232 |
| 6,404,570 B1 * | 6/2002 | McNeil et al. | ................ | 360/31 |
| 6,405,342 B1 * | 6/2002 | Lee | ............................ | 714/792 |
| 6,446,236 B1 * | 9/2002 | McEwen et al. | ............ | 714/795 |
| 6,480,984 B1 * | 11/2002 | Aziz | .......................... | 714/795 |
| 6,513,141 B1 * | 1/2003 | Livingston | .................. | 714/792 |
| 6,530,060 B1 * | 3/2003 | Vis et al. | ..................... | 714/792 |
| 6,594,214 B1 * | 7/2003 | Misaizu | ................... | 369/53.11 |
| 6,604,220 B1 * | 8/2003 | Lee | ............................ | 714/769 |
| 6,912,099 B2 * | 6/2005 | Annampedu et al. | .......... | 360/39 |
| 7,006,019 B2 * | 2/2006 | Lee et al. | ..................... | 341/59 |
| 7,191,083 B2 * | 3/2007 | Ashley et al. | ............... | 702/107 |
| 7,350,118 B2 * | 3/2008 | Sakagami | ................... | 714/701 |
| 2003/0095350 A1 * | 5/2003 | Annampedu et al. | .......... | 360/39 |
| 2005/0264910 A1 * | 12/2005 | Lee | .............................. | 360/69 |

* cited by examiner

*Primary Examiner*—Hoa T Nguyen
*Assistant Examiner*—Dismery E Mercedes
(74) *Attorney, Agent, or Firm*—Mendelsohn, Drucker & Associates, P.C.; Kevin M. Drucker; Steve Mendelsohn

(57) ABSTRACT

A recording system, such as a magnetic or optical recording system, employs optimization metrics that are independent of a target partial response for equalization of a signal read from a recording channel. The optimization metrics employ samples adjacent to codeword boundaries of codewords representing encoded data, such as servo data, read from a recording medium. The optimization metrics are used to select filter parameters and/or tap weights for equalization. The filter parameters and/or tap weights might be derived based on the type of data read from the recording medium, the type of detector employed to detect the codewords of the read data, and the type of encoder/decoder employed for the read data.

32 Claims, 2 Drawing Sheets

CHANNEL OPTIMIZATION METRICS

BACKGROUND OF THE INVENTION

1. Field of the Invention

The present invention relates to data transfer through a communication channel, and, more particularly, to channel optimization metrics for detection of data read from a recording medium.

2. Description of the Related Art

A read channel component is an integrated circuit (IC) of a computer hard disk (HD) drive that encodes, detects and decodes data, enabling a read/write head to correctly i) write data to the disk drive and ii) read back the data. The disks in an HD drive have a number of tracks, each track consisting of i) user (or "read") data sectors and ii) control (or "servo") data sectors embedded between the read sectors. Information stored in the servo sectors is employed to position the head (e.g., a magnetic recording/playback head) over a track so that the information stored in the read sector can be retrieved properly.

FIG. 1 shows information of servo sector 100 of a prior art HD drive. Servo sector 100 comprises preamble 101, (encoded) servo address mark (SAM) 102, (encoded) Gray data 103, burst demodulation (demod) field 104, and repeatable run-out (RRO) field 105.

Preamble 101, which is typically a 2T pattern, allows for timing recovery and gain adjustment of the written servo data. SAM 102 is an identifier of fixed bit-length that identifies the beginning of servo data, with the value for this identifier the same for all servo sectors. Gray data 103 represents the track number/cylinder information and provides coarse positioning information for the head. Burst demod field 104 provides fine positioning information for the head. RRO data 105 provides head positioning information that is i) finer than that provided by Gray data and ii) coarser than that provided by the burst demodulation fields. Specifically, RRO data 105 is typically employed to compensate for when the head does not follow a circular track around the disk.

Digital signal processing techniques are commonly employed during detection of servo sector information, although older systems employ analog signal processing techniques. Channel optimization is employed to achieve good data bit error rate performance by equalizing the channel to a known and preferred target partial response. The "channel" has a channel response that includes the response of the path that writes encoded data as a signal from a write head onto a recording medium, the recording medium itself, the path that reads the encoded data as a signal, and circuitry that subsequently processes the read signal. Channel optimization minimizes a predefined metric, such as the root mean square (r.m.s.) of the error between the received, equalized samples (representing the equalized signal read from the disk) and the expected (or "ideal") samples corresponding to the target partial response. Also, error samples used for channel optimization are computed and used every symbol period 'T'.

User data is typically encoded using a run length limited (RLL) code before recording, and the read user data is typically detected with a sequence detector employing, for example, a Viterbi algorithm (i.e., a Viterbi detector). The algorithm of the Viterbi detector is based on, or is "matched", to the preferred target partial response. Since the Viterbi detector is matched to a preferred and known target partial response, the channel is equalized to the same partial response to get optimum performance (bit error rate) from the Viterbi detector.

However, for servo data, encoders and detectors might not require channel equalization to a specific target partial response. Thus, channel optimization is not needed. In addition, equalizing the read signal containing the servo data based on minimizing a predefined metric might not provide optimum servo data error rate performance and might even degrade the servo data error rate performance. Prior art channel optimization metrics do not employ a priori knowledge about servo encoders and detectors to improve servo data error rate performance.

For a prior art recording system, servo data is encoded and written to a magnetic disk. The information from the disk that includes the servo data is read by a magnetic recording head and, after AC coupling, is applied to a variable gain amplifier (VGA) which adaptively adjusts the gain of the input signal to desirable levels. The output of the VGA is then equalized using a continuous time filter (CTF) and a finite impulse response (FIR) filter with a certain number of taps (usually 10 taps). Equalization is typically achieved by varying the cut-off frequency and the zero frequency of the CTF and by adaptively modifying the tap values, or weights, of the FIR filter. Since servo data is typically of very short length having few spectral frequency components, the FIR filter is generally not adaptively modified based on servo data. Instead, different programmable values for the FIR filter tap weights are tried by brute-force method for performance optimization.

The output signal of the FIR filter is digitized into samples y(kT) with an A/D converter (ADC), where T is the ideal symbol rate. ADC samples y(kT) are used by a servo data detector, such as a Viterbi or threshold detector, to detect encoded servo data (i.e., samples representing codeword symbols). The Viterbi detector may employ servo data encoder constraints generated by a codeword boundary synchronizer that detects boundaries between codewords in the encoded servo data. The detected encoded servo data is decoded to generate the SAM, Gray data, servo burst demod, and RRO information.

Convolving the detected data y(kT) with a known target partial response generates ideal samples ŷ(kT). For example, [0 0 1 1 1 1 0 0 0 1 1] equalized to target partial response [10 10 −10 −10] yields ŷ(kT) samples [20 10 0 −10 −20 −10 0 10 20]. If e(kT) denotes the error between the received equalized samples y(kT) and the ideal samples ŷ(kT) corresponding to the target partial response, then e(kT) is calculated as in equation (1):

$$e(kT) = y(kT) - \hat{y}(kT). \quad (1)$$

An optimization metric is calculated as the root mean square of the error e(kT). For design simplicity, the sum of squares of the error is also an optimization metric OM given in equation (2):

$$OM = \sum_{n=0}^{N-1} [e(nT)]^2 = \sum_{n=0}^{N-1} [y(nT) - \hat{y}(nT)]^2, \quad (2)$$

where N is the total number of bit periods over which the optimization metric is computed.

Prior art channel optimization equalizes the channel to a known and preferred target partial response by minimizing the OM of equation (2). The OM is computed over different settings of i) corner cut-off frequency and zero frequency of the CTF and ii) the FIR tap weight values. The CTF and FIR settings corresponding to the minimum OM are taken as the optimum setting for servo data detection. Error rate performance of a channel optimized based on a particular target partial response is limited by the choice of target partial response. Also, the chosen target partial response might not be optimum over a wide range of conditions, such as differing impulse responses of magnetic heads from different head manufacturers, different channel bit densities (CBDs), and differing media noise coloration.

SUMMARY OF THE INVENTION

In accordance with embodiments of the present invention, a signal read from a recording medium identifies samples of the signal at codeword boundaries as boundary samples, wherein the signal represents data encoded into codewords; processes each identified boundary sample to generate a corresponding signal indicator; and calculates an optimization metric based on a collection of signal indicators.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

A recording system, such as a magnetic or optical recording system, employs optimization metrics that are independent of a target partial response for a signal read from a recording channel. The optimization metrics employ samples adjacent to codeword boundaries of codewords representing encoded user data read from a recording medium. The optimization metrics are used to select equalization parameters. The equalization parameters are derived based on the type of data read from the recording medium, the type of detector employed to detect the codewords of the read data, and the type of encoder/decoder employed for the read data.

The exemplary embodiments described herein detect and decode servo data read from a magnetic recording medium, although one skilled in the art might readily extend the teachings herein to detecting and decoding data from other types of channels. For example, the present invention might be employed for detecting and decoding data from optical recording media, or from a wired or wireless communications channel.

Figure 2:
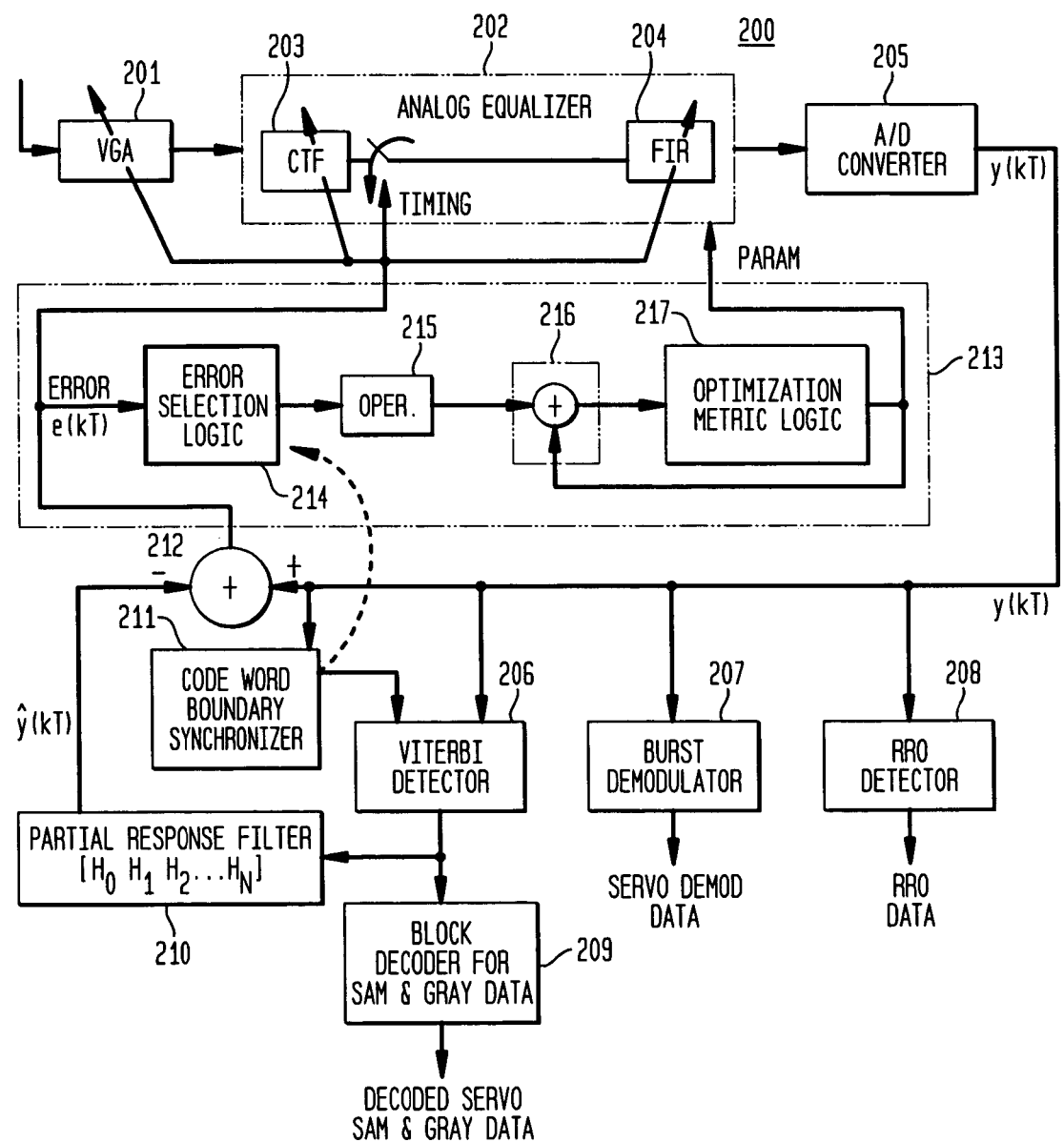
FIG. 2 shows a read channel servo data detector/decoder for first and second exemplary embodiments of the present invention.

FIG. 2 shows a read channel servo data detector/decoder ("servo decoder") 200 employing one or more exemplary embodiments of the present invention. Servo decoder 200 comprises variable gain amplifier (VGA) 201 adaptively adjusting gain of an input signal read from, for example, a magnetic recording medium. The adjusted signal from VGA 201 is applied to equalizer 202 comprising continuous time filter (CTF) 203 and finite impulse response (FIR) filter 204. After initial filtering of the input analog signal by CTF 203, equalizer 202 samples the signal with period T, where T is the ideal symbol rate. FIR filter 204 is characterized by a certain number of tap values, or weights, (e.g., 10 tap values). Equalization of the input signal by equalizer 202 varies with the cut-off frequency and the zero frequency of CTF 203 and adaptive modification of the tap weights of FIR filter 204.

The parameters for CTF 203 and FIR filter 204 are set based on a signal param from optimization metric calculator 213. Error signal e(kT), generated as described subsequently, is employed by equalizer 202 to adjust timing for sampling of the signal from CTF 203 in order to synchronize sampling with the phase and frequency of the symbol rate of the servo data. Signal param is employed by equalizer 202 to select the CTF cut-off frequency, CTF zero frequency, and FIR filter tap weight parameters. Signal param is generated based on optimization metrics derived as described subsequently. Parameters for CTF 203 and FIR filter 204 that are associated with a particular value of optimization metric might be accomplished through simulation, system observation, or a combination of simulation and observation.

The output signal of FIR filter 204 is quantized into digital samples y(kT) by A/D converter (ADC) 205. Since timing of the digital samples y(kT) corresponds to the symbol rate, each of the digital samples y(kT) corresponds to a symbol value degraded by, for example, noise or other channel effects.

Servo decoder 200 further comprises Viterbi detector 206, burst demodulator (demod) 207, repeatable run-out (RRO) detector 208, block decoder 209, and codeword boundary synchronizer (CWBS) 211. Operation of Viterbi detector 206, burst demod 207, RRO detector 208, block decoder 209, and CWBS 211 for processing the detected blocks of servo data is well-known in the art, and briefly summarized as follows.

Samples y(kT) are used by burst demod 207 and RRO detector 208 to generate burst demodulation information and RRO data, respectively. Samples y(kT) are also used by Viterbi detector 206 to detect the SAM and Gray data codeword portions of the servo data. Viterbi detector 206 employs information from CWBS 211 as to groups of symbols in the data corresponding to codewords, indicating likely divisions within the received samples y(kT) corresponding to the boundary between symbols of adjacent codewords. The detected servo data from Viterbi detector 206 is applied to block decoder 209, which generates decoded SAM and Gray information.

Figure 1:
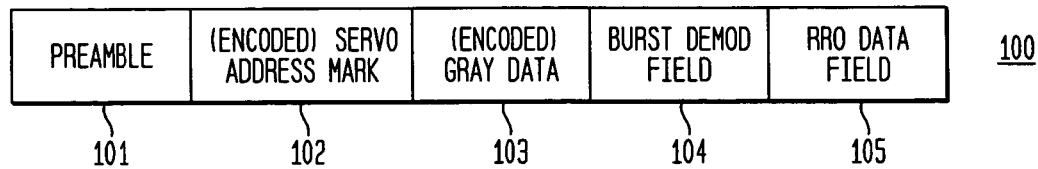
FIG. 1 shows servo sector information of a prior art hard drive.

As shown in FIG. 1, servo data comprises a preamble, service address mark (SAM) gray data, burst demod data and RRO data, which are encoded using, for example, a run-length limited code to generate blocks of symbols recorded to and read from the medium. For certain embodiments of the present invention described herein, servo data is encoded with a biphase code and servo decoder 200 employs a threshold detector for detecting the servo data. Such methods are known in the art and described in, for example, Bergmans et al., "Analysis of a biphase-based servo format for hard disk drives," IEEE Transactions on Magnetics, Vol. 36, Issue 6, pp 4019-4027, November 2000.

For exemplary servo data, a 2T preamble pattern of "001100110011 . . . " is followed by SAM and Gray data that are both encoded with a wide biphase code. For an exemplary wide biphase code, a servo encoder encodes a servo data value of "1" to codeword "0 0 1 1" and a servo data value of "0" to codeword "1 1 0 0". The read-back waveform from the recording medium for such a wide biphase encoded signal exhibits a relatively large positive peak (corresponding to servo data "1") or a relatively large negative peak (corresponding to servo data "0") at the codeword boundary. The magnitude of the peak value depends on the peak level magnitude that automatic gain control of VGA 201 is adjusting to when receiving the preamble pattern.

Viterbi detector 206 generates a sequence of symbols corresponding to the detected codewords. Block decoder 209 includes a threshold detector (not shown in FIG. 2) that slices the detected symbols with a threshold of zero at the codeword boundary to decode the servo data (i.e., to generate a "1" or a "0").

CWBS 211 can operate as follows. During receipt of the preamble field, because of the repetitive 2T pattern, there is a positive peak every 4T at the boundary of 0011. CWBS 211 detects and synchronizes to this peak every 4T. Codeword boundary timing is synchronized beyond the preamble field by detecting time instants that are in multiples of 4T from a positive peak in the preamble field.

If the output of ADC 205 generates a digital sample sequence of [0 20 0 −20 0 20 0 −20] (every symbol period T) over the preamble field, then this sample sequence corresponds to numerous target partial responses. For example, the preamble pattern [0 0 1 1 0 0 1 1 0 0 1 1] convolved with a [7 7 −7 −7] target partial response generates the sample sequence of [0 14 0 −14 0 14 0 −14]. The same digital sample sequence of [0 14 0 −14 0 14 0 −14] also results from [0 0 1 1 0 0 1 1 0 0 1 1] convolved with the [10 8 −8 −6 −4] target partial response. Thus, multiple target partial responses validly generate the desired digital sample sequence.

In accordance with a first exemplary embodiment of the present invention, the optimization metric is the root mean square (r.m.s.) of the error between the detected and ideal samples that occur only at the codeword boundary, which is every 4T for the exemplary wide biphase code where either a +20 or a −20 level appears at the output of ADC 205. The r.m.s. of the error is minimized over different combination settings of cut-off frequency and zero frequency of CTF 203 and tap weights of FIR filter 204. The settings for CTF 203 and FIR filter 204 corresponding to this minimum r.m.s. error are then employed as the settings for servo data detection. Consequently, by not processing the samples of y(kT) other than those occurring at the codeword boundary, the servo data portion of the read-back waveform is not equalized to a particular target partial response since many different target partial responses generate the samples y(kT) appearing at the output of ADC 205.

If e(kT) denotes the error between the received equalized samples y(kT) and the expected ideal samples ŷ(kT) corresponding to a target partial response, then e(kT) is calculated as in equation (1), repeated below:

$$e(kT) = y(kT) - \hat{y}(kT). \quad (1)$$

In FIG. 2, the ideal samples are generated by partial response filter 210 by applying the target partial response to the detected samples from Viterbi detector 206, where the impulse response of partial response filter 210 matches the desired target partial response. Combiner 212 then generates the error samples e(kT) calculated as in equation (1).

To reduce complexity of a given implementation of the first embodiment, the sum of the squares of the error might be employed instead of the r.m.s of the error. For the exemplary wide biphase coding, the sum of the squares error is given in equation (3):

$$OM = \sum_{n=0}^{N-1} [e(n4T)]^2 = \sum_{n=0}^{N-1} [y(n4T) - \hat{y}(n4T)]^2, \quad (3)$$

where N is the number of samples in a predefined sample window, which may correspond to a portion of the preamble. The number "4" in equation (3) specifies that samples selected at multiples of 4T apart correspond to either positive or negative peaks at codeword boundaries in the exemplary wide biphase encoding previously described. One skilled in the art might extend the teachings herein to other encoding and different codeword lengths. Codeword boundary synchronization to the 4T-apart peaks is accomplished using information generated by CWBS 211.

Returning to FIG. 2, optimization metric calculator 213 comprises error selection logic 214, operator (oper) 215, integrator 216, and optimization metric logic 217. Error selection logic 214 selects only the error samples e(kT) corresponding to those at the codeword boundaries. Oper 215 performs the mathematical operation of squaring the selected error sample values from error selection logic 214, and integrator 216 sums the squared samples from oper 215 over a period N. Optimization Metric logic 217 then selects values for signal param based on the value from integrator 216 at sample time N.

An alternative to the first exemplary embodiment employs the sum of absolute values of the errors instead of the sum of squares of the errors to avoid, for example, costly squaring logic. For the sum of absolute values of this second exemplary embodiment, the optimization metric is as given in equation (4).

$$OM = \sum_{n=0}^{N-1} |e(n4T)| = \sum_{n=0}^{N-1} |y(n4T) - \hat{y}(n4T)| \quad (4)$$

where |•| denotes the absolute value function. To generate the optimization metric according to equation (4), oper 215 of FIG. 2 performs an absolute value of the input error sample instead of squaring the value.

In accordance with a third exemplary embodiment of the present invention, the optimization metric is based on a count of the number of samples at codeword boundaries that are above a predetermined quality threshold thrsh (e.g., 16 LSBs for a 20-LSB target level, where LSB is "least significant bit" and represents the quantization level of the ADC). The optimization metric is maximized for different combination settings of the CTF and FIR tap weight parameters. The CTF and FIR setting parameters corresponding to the maximum number of samples (over SAM and Gray fields) above the quality threshold thrsh is taken as the optimized setting for servo data detection. By using higher and higher values for the programmable threshold thrsh, the optimization metric employs "better quality" samples from the ADC corresponding to the codeword boundary peaks, giving better servo SAM and Gray data error rate performance.

For the third exemplary embodiment and exemplary wide biphase code, the optimization metric is as given in equation (5):

$$OM = \left( \sum_{n=0}^{N-1} [y((n4T)] > thrsh \right). \quad (5)$$

Figure 3:
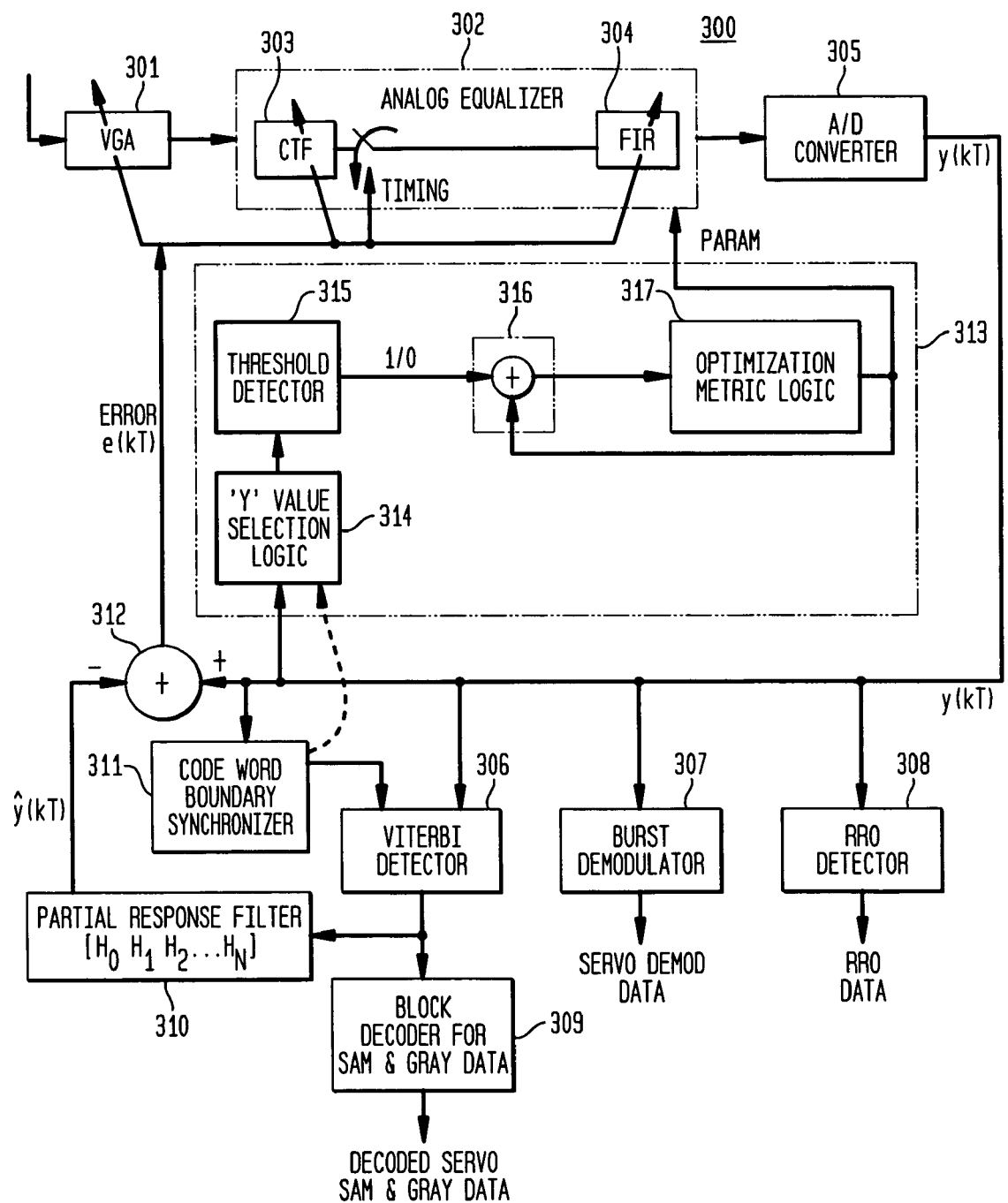
FIG. 3 shows a read channel servo data detector/decoder for a third exemplary embodiment of the present invention.

FIG. 3 shows servo decoder 300 for the third exemplary embodiment of the present invention. Servo decoder 300 comprises VGA 301, equalizer 302, ADC 305, Viterbi detector 306, burst demod 307, RRO detector 308, block decoder 309, partial response filter 310, CWBS 311, and combiner 312. VGA 301, equalizer 302, ADC 305, Viterbi detector 306, burst demod 307, RRO detector 308, block decoder 309, partial response filter 310, CWBS 311, and combiner 312 operate in a manner similar to that of VGA 201, equalizer 202, ADC 205, Viterbi detector 206, burst demod 207, RRO detector 208, block decoder 209, partial response filter 210, CWBS 211, and combiner 212 of FIG. 2.

Optimization metric calculator 313 comprises "Y" value selection logic 314, threshold detector 315, integrator 316, and optimization metric logic 317. To generate the signal param, the "Y" value selection logic 314 selects those samples corresponding to codeword boundaries using information from CWBS 311. The selected samples from "Y" value selection logic 314 are compared to threshold thrsh by threshold detector 315. Each time the threshold thrsh is exceeded, threshold detector 315 generates a "1", otherwise, threshold detector 315 generates a "0". The output of threshold detector 315 is integrated over N selected samples by integrator 316 to generate the optimization metric, such as in accordance with equation (5). The optimization metric is then employed by optimization metric logic 317 to provide CTF and FIR filter parameters with signal param.

A read channel of a recording system operating in accordance with one or more embodiments of the present invention may exhibit the following advantages. A receiver detecting and decoding data in accordance with embodiments of the present invention might exhibit enhanced performance for, for example, differing impulse responses of magnetic/optical heads, different channel bit densities (CBDs), and differing media noise coloration. Optimization metrics that are independent of target partial responses might allow for better error rate performance, and might achieve more than one dB in servo error rate performance. The optimization metrics are easier to compute than prior art metrics by avoiding processing of all error samples and considering those samples corresponding to the codeword boundary.

While the present invention has been described with respect to certain equations, the present invention is not so limited. The equations herein might be considered as simplified models of naturally occurring signals, functions, or processes. One skilled in the art might extend the teachings herein to other error functions or cost criteria that can be optimized with respect to a given mathematical criterion. In addition, the various equations might be modified linearly through multiplication or addition of constants.

While the exemplary embodiments of the present invention have been described with respect to a system with block diagrams, the various functional elements of the present invention may be implemented with circuits or may be implemented in the digital domain as processing steps in a software program. Such software may be employed in, for example, a digital signal processor, dedicated logic circuit, micro-controller, or general purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of processing a signal read from a recording medium, the method comprising the steps of:
   (a) identifying samples of the signal at codeword boundaries as boundary samples, wherein the signal represents data encoded into codewords;
   (b) processing each identified boundary sample to generate a corresponding signal indicator; and
   (c) calculating an optimization metric based on a collection of signal indicators.

2. The invention as recited in claim 1, further comprising the step of (d) selecting parameters for equalization of the signal based on the optimization metric.

3. The invention as recited in claim 2, further comprising the step of (e) equalizing the signal based on the parameters.

4. The invention as recited in claim 1, wherein step (c) includes the step of combining two or more signal indicators over a predefined number of identified samples to form the collection.

5. The invention as recited in claim 4, wherein step (b) generates each signal indicator with an error value, the error value based on the corresponding identified sample and an associated ideal identified sample.

6. The invention as recited in claim 5, wherein step (b) generates each signal indicator as either i) a root mean square, ii) a sum of the squares, or iii) a sum of the absolute values of the error value.

7. The invention as recited in claim 4, wherein step (b) generates each signal indicator based on a comparison of the identified sample with a predefined threshold level.

8. The invention as recited in claim 1, wherein, for step (a) the signal represents servo data encoded into codewords, the servo data having a preamble portion.

9. The invention as recited in claim 8, wherein step (a) identifies samples corresponding to the preamble portion.

10. The invention as recited in claim 8, wherein the servo data is encoded with a wide biphase code.

11. The invention as recited in claim 1, wherein the method is embodied as steps of a processor in an integrated circuit (IC).

12. The invention of claim 1, wherein the identified boundary samples processed to generate the corresponding signal indicator are only a subset of the samples of the signal read from the recording medium.

13. The invention of claim 12, wherein the subset comprises only boundary samples.

14. The invention of claim 1, wherein the signal indicators are used for selecting one or more equalization parameters.

15. The invention of claim 14, wherein the equalization parameters include one or more of (i) filter parameters and (ii) tap weights.

16. The invention of claim 1, further comprising using the optimization metric to select one or more equalization parameters.

17. The invention of claim 16, wherein the equalization parameters include one or more of (i) filter parameters and (ii) tap weights.

18. Apparatus for processing a signal read from a recording medium, the apparatus comprising:
- a codeword boundary synchronizer adapted to identify samples of the signal at codeword boundaries as boundary samples, wherein the signal represents data encoded into codewords; and
- an optimization metric calculator including:
  - a first logic circuit adapted to process each identified boundary sample to generate a corresponding signal indicator; and
  - a second logic circuit calculating an optimization metric based on a collection of signal indicators.

19. The invention as recited in claim 18, wherein the second logic circuit is further adapted to select parameters for equalization of the signal based on the optimization metric.

20. The invention as recited in claim 18, wherein the second logic circuit is adapted to combine two or more signal indicators over a predefined number of identified samples to form the collection.

21. The invention as recited in claim 20, wherein the first logic circuit generates each signal indicator with an error value, the error value based on the corresponding identified sample and an associated ideal identified sample.

22. The invention as recited in claim 21, wherein the first logic circuit generates each signal indicator as either i) a root mean square, ii) a sum of the squares, or iii) a sum of the absolute values of the error value.

23. The invention as recited in claim 20, wherein the first logic circuit generates each signal indicator based on a comparison of the identified sample with a predefined threshold level.

24. The invention as recited in claim 18, wherein the signal represents servo data encoded into codewords, the servo data having a preamble portion, and the codeword boundary synchronizer identifies samples corresponding to the preamble portion.

25. The invention as recited in claim 18, wherein the apparatus is embodied in an integrated circuit (IC).

26. The invention as recited in claim 25, wherein the IC is implemented as a component of either a magnetic recording system or an optical recording system.

27. The invention of claim 18, wherein the identified boundary samples processed to generate the corresponding signal indicator are only a subset of the samples of the signal read from the recording medium.

28. The invention of claim 27, wherein the subset comprises only boundary samples.

29. The invention of claim 18, wherein the signal indicators are used to select one or more equalization parameters.

30. The invention of claim 29, wherein the equalization parameters include one or more of (i) filter parameters and (ii) tap weights.

31. The invention of claim 18, wherein the optimization metric is used to select one or more equalization parameters.

32. The invention of claim 31, wherein the equalization parameters include one or more of (i) filter parameters and (ii) tap weights.

* * * * *